United States Patent
Zubieta et al.

(10) Patent No.: US 9,898,018 B2
(45) Date of Patent: Feb. 20, 2018

(54) POWER CLIPPING METHOD AND SYSTEM

(71) Applicant: Arda Power Inc., Oakville, Ontario (CA)

(72) Inventors: Luis Zubieta, Oakville (CA); Clemens vanZeyl, Oakville (CA)

(73) Assignee: Arda Power Inc., Oakville, Ontario (CA)

( * ) Notice: Subject to any disclaimer, the term of this patent is extended or adjusted under 35 U.S.C. 154(b) by 204 days.

(21) Appl. No.: 13/828,290

(22) Filed: Mar. 14, 2013

(65) Prior Publication Data

US 2014/0265567 A1    Sep. 18, 2014

(51) Int. Cl.
G05F 1/12 (2006.01)
H02J 1/14 (2006.01)
H02J 3/38 (2006.01)
H02J 1/12 (2006.01)

(52) U.S. Cl.
CPC ............... G05F 1/12 (2013.01); H02J 1/12 (2013.01); H02J 1/14 (2013.01); H02J 3/383 (2013.01); Y02E 10/563 (2013.01); Y10T 307/352 (2015.04)

(58) Field of Classification Search
CPC ........... G05F 1/12; Y10T 307/352; H02J 1/14
USPC .......................................................... 322/17
See application file for complete search history.

(56) References Cited

U.S. PATENT DOCUMENTS

| | | | | |
|---|---|---|---|---|
| 5,724,477 | A * | 3/1998 | Webster | H02P 29/026 318/504 |
| 6,801,019 | B2 * | 10/2004 | Haydock et al. | 322/17 |
| 7,256,516 | B2 * | 8/2007 | Buchanan et al. | 307/62 |
| 7,692,321 | B2 * | 4/2010 | Jones | H02M 5/4585 290/43 |
| 7,952,225 | B2 * | 5/2011 | Reichard et al. | 307/10.1 |
| 8,378,641 | B2 * | 2/2013 | Rozman et al. | 322/24 |
| 8,482,947 | B2 * | 7/2013 | Chapman | H02J 3/38 363/71 |
| 8,499,909 | B2 * | 8/2013 | Mazumdar | B60L 7/06 105/49 |
| 8,526,205 | B2 * | 9/2013 | Garrity | 363/37 |
| 8,664,788 | B1 * | 3/2014 | Wagoner | F03D 7/0244 290/44 |
| 2005/0105224 | A1 * | 5/2005 | Nishi | H02M 3/285 361/18 |

(Continued)

OTHER PUBLICATIONS

Katie Malone, Electrical Load Management, Oct. 24, 2010.pp. 1-3.*

(Continued)

*Primary Examiner* — Thienvu Tran
*Assistant Examiner* — Pinping Sun
(74) *Attorney, Agent, or Firm* — Head, Johnson, Kachigian & Wilkinson, PC (57) ABSTRACT

An improved method for controlling an electrical distribution system of the type having a plurality of electrical sources, a load, a DC link coupling the electrical sources to the load and a control means for controlling the output of at least one of the plurality of electrical sources so that the plurality of sources deliver to the load an amount of power appropriate to the load. The improvement comprises an adaptation in respect of the load that provides for the DC link voltage to vary; and an adaptation of the control means resulting in the output being controlled as a direct function of the DC link voltage.

8 Claims, 8 Drawing Sheets

(56) References Cited

U.S. PATENT DOCUMENTS

| | | | |
|---|---|---|---|
| 2011/0205773 A1* | 8/2011 | Wagoner | H02J 3/383 363/132 |
| 2011/0273022 A1* | 11/2011 | Dennis | H02J 1/10 307/72 |
| 2012/0042588 A1* | 2/2012 | Erickson, Jr. | H01L 31/02021 52/173.3 |
| 2012/0187766 A1* | 7/2012 | Cleland | H02J 1/10 307/82 |
| 2012/0228951 A1* | 9/2012 | Lehmann | 307/85 |
| 2012/0267952 A1 | 10/2012 | Ballatine et al. | |
| 2012/0280569 A1* | 11/2012 | Alam | H02J 3/32 307/60 |
| 2013/0076151 A1* | 3/2013 | Bae et al. | 307/82 |
| 2013/0230121 A1* | 9/2013 | Molko | H04L 27/2623 375/295 |
| 2013/0300380 A1* | 11/2013 | Brunotte et al. | 322/59 |
| 2014/0042815 A1* | 2/2014 | Maksimovic | H02J 1/00 307/63 |
| 2014/0050000 A1* | 2/2014 | Teo | H02M 7/487 363/131 |
| 2014/0183949 A1 | 7/2014 | Murano | |

OTHER PUBLICATIONS

Li Zhang, Tianjin Wu, Yan Xing, Kai Sun and Josep.M Gurrero, "Power control of DC Microgrid Using DC Bus Signaling," IEEE, pp. 1926-1932, 2011.

\* cited by examiner

POWER CLIPPING METHOD AND SYSTEM

BACKGROUND OF THE INVENTION

1. Field of the Invention

The present invention relates to an electrical distribution system and a method for controlling an electrical distribution system.

2. Prior Art

It is a common practice to design a PV installation with an array-to-inverter ratio above 100%. That means that in high irradiance and/or low temperature conditions the array is able to produce more power that the inverter is able to handle. This is done because most of the time the array will operate below the maximum theoretical power, and therefore, if the ratio is selected at 100%, most of the time the plant will be producing less power than it is rated for.

Due to the rating of the inverter or because of limits in the interconnection agreement, the inverter commonly should not convert more power than a design value Pgrmax. Consequently, when the array is capable of operating at a power above Pgrmax, the inverter will limit or "clip" the power. In addition, there is the trend to establish dynamic limits to power produced by PV power plants so that a central utility controller can limit the power being injected to the grid depending on the balance between generation from conventional plants and load fluctuations. In this case, Pgrmax would be changed usually in steps by an external command to the inverter and the inverter should "clip" the generated power to this variable limit.

Figure 1:
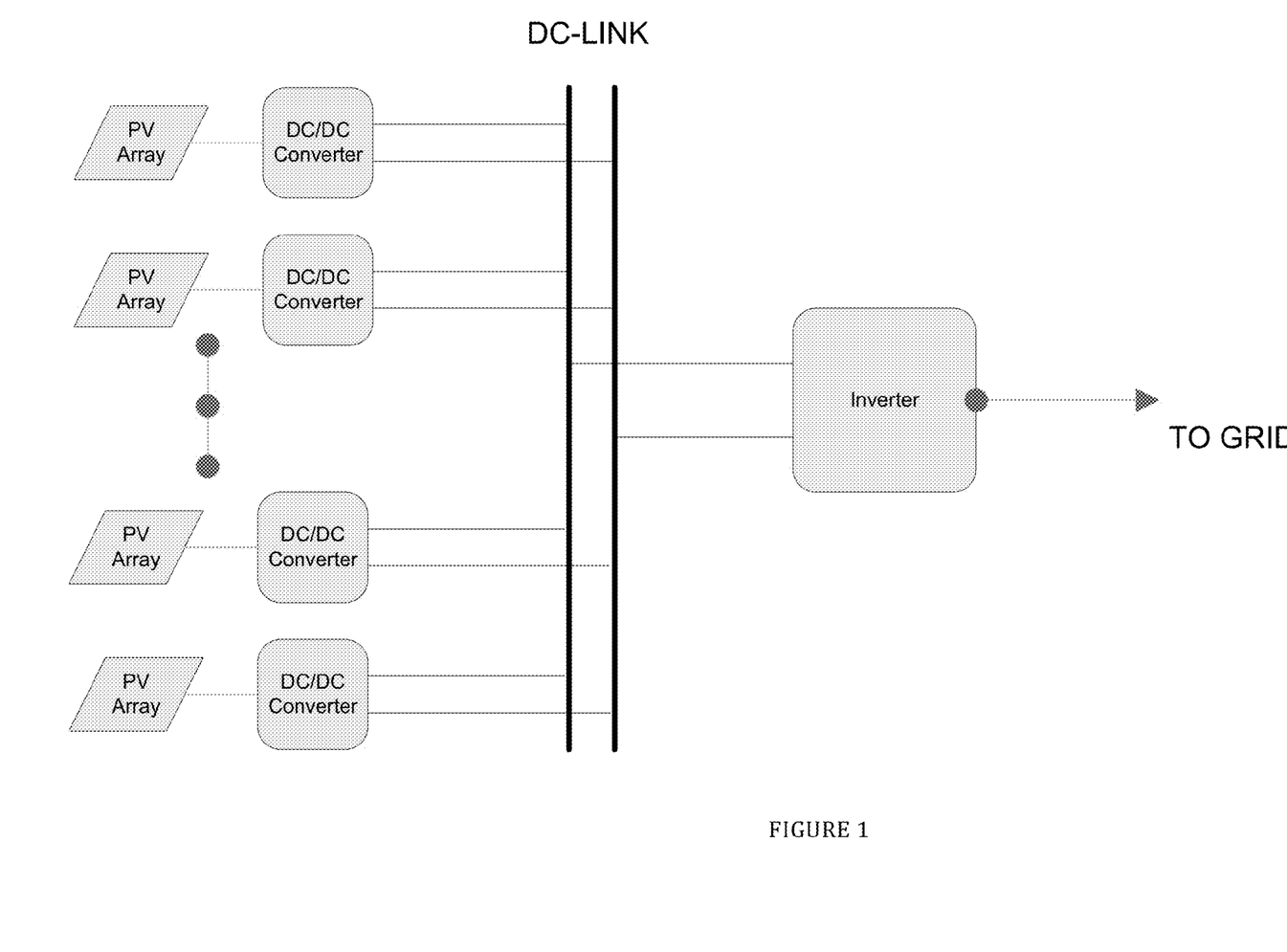
FIG. 1 is a schematic diagram of a conventional DC-Link Distributed PV installation.

In conventional applications, the clipping is executed by the inverter. The way the inverter clips the power is by reducing the current drawn from the PV array so that the operation point goes away from the maximum power point and a power below the maximum is injected to the grid. In a distributed PV system with DC/DC converters transferring power between groups of PV modules and a common DC-link like the one in FIG. 1, the maximum power point tracking (MPPT) algorithm is executed by the DC/DC converters but the interconnection with the grid is executed by the inverter. The power from the generators has to be clipped by the DC/DC converters and not by the inverter. To achieve the power clipping in a distributed system using DC/DC converters in a simple way, each DC/DC converter is provided with a pre-established maximum power setting.

Figure 2:
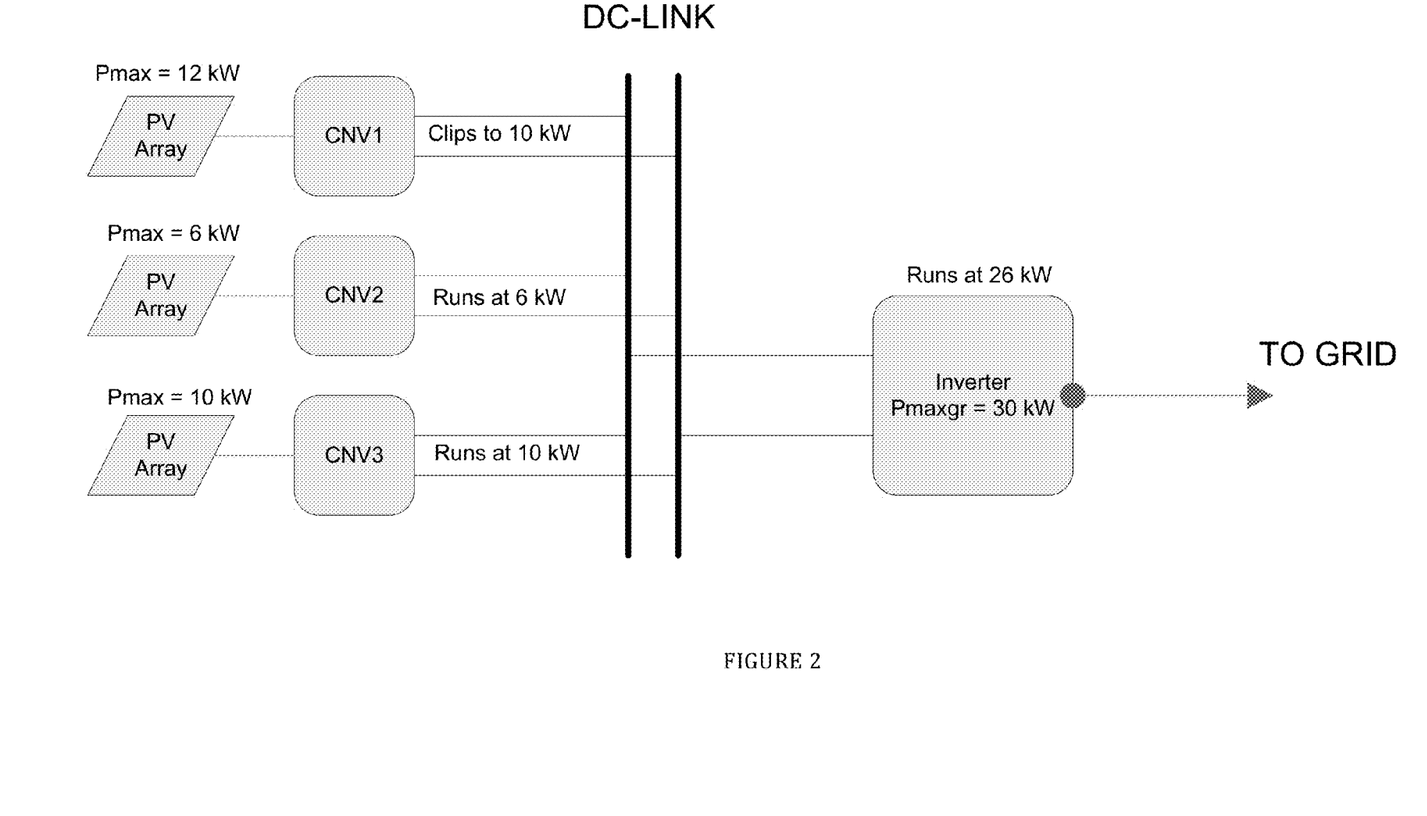
FIG. 2 is an exemplary power diagram of the structure of FIG. 1, showing power reduction due to clipping.

This method does not maximize the power production from the complete installation. This is because some DC/DC converters may unnecessarily be clipping the power. This case is explained in FIG. 2 where a maximum power of 30 kW can be produced by an installation with 3 DC/DC converters such that a 10 kW clipping is set on each of the converters. At some instant, the array connected to CNV1 may be capable of producing power 12 kW while the array connected to CNV2 is shaded and only able to produce 6 kW, and the array connected to CNV3 is able to produce 10 kW. CNV1 would then clip its power to 10 kW but then the complete installation would produce 26 kW instead of the maximum 30 kW specified. Due to the shading of CNV2, it would be acceptable to operate CNV1 at 12 kW without exceeding the total power limit for the installation but CNV1 has a power clipping limit that does not take in account the power produced by the other converters. Another limitation of this simple method is that the maximum power cannot be easily changed after the system is commissioned so that the dynamic power limit is not possible.

A known method to overcome this weakness is to use a communication network to actively clamp the power from each converter based on the power measured by the inverter. In this method, the inverter appropriately controls each converter when power clipping is required via the communication network. This strategy can be complex, slow in response and costly to implement since a reliable communication link between the inverter and the DC/DC converters is needed.

SUMMARY OF THE INVENTION

Forming one aspect of the invention is a method to automatically provide a power limit to the DC/DC converters without dependence on a traditional communication network. This method uses the DC-link voltage as the parameter that "communicates" to the DC/DC converters the need to clip the power. The invention is fully described in following passages, with reference to the enclosed drawings, these being briefly described hereinafter.

DETAILED DESCRIPTION OF THE PREFERRED EMBODIMENTS

Because the DC-link is connected to each of the DC/DC converters so they can feed their processed power, all of the converters will have access to a DC-link voltage measurement (normally this voltage measurement is part of the DC/DC converters as it is needed for control and protection). The DC-link voltage is controlled by the inverter in a system like the one in FIG. 1.

Thus, in terms of required modifications to existing inverters, in many cases, only a modification in the inverter software would be required [i.e. a modification such that the DC-link voltage is varied by the inverter when clipping is needed.]

In one embodiment, the DC-link voltage would be $V_{nom}$ [rated operating voltage of the inverter] when the inverter is processing any power below the current Pgrmax [maximum rated output power of the inverter]. When the power reaches Pgrmax, the DC-link voltage will be increased with a slow PI characteristic that functions to regulate the output power Po at Pgrmax. The range in DC-link voltage should be limited such that the maximum output voltage $V_{nom}+\Delta V max$ does not result in any degradation in performance or incorrect operation of any of the components and the time constant of the controller should be slow enough to allow for the distributed converters to react to the change in DC-link voltage. The DC-link voltage adjustment is then implemented in the inverter following equation:

$$Vdc_{link} = V_{nom} + Kp*(Po-Pgr_{max}) + Ki\int(Po-Pgr_{max})dt \quad (1)$$

Persons of ordinary skill will readily appreciate the $\Delta V$ that the components can accommodate without degradation and will readily be able to generate a slow PI function that accommodates the expected range in Po while maintaining the permissible $\Delta Vdc_{link}$.

The power clipping is then implemented in the distributed DC converters as a function of the voltage such that the maximum power that can be output by a converter ($P_{max}$) is equal to the rated power ($P_{nom}$) if the input voltage is at or below the nominal DC-link voltage ($Vdc_{nom}$) and is reduced if the DC-link voltage is increased using an equation such as:

$$P_{max} = P_{nom} - Kc*(Vdc-Vdc_{min}) \quad (2)$$

Generalization of Variable DC-Link Voltage in DC Distributed Systems with a Common DC-Link The invention is not limited to power clipping in PV generators.

It may, for example, be used in DC distributed systems with different types of power sources and loads. The controllable DC-link voltage concept is also applicable to grid independent systems such as a system with an energy storage system coupled into a DC-link using a DC/DC converter. In some cases the goal may not be power clipping but any other requirement to the main system control component.

Further, the DC-link voltage equation (1) does not need to be a PI relationship but any relation that may include linear, quadratic, integral, or derivate terms amongst others. Furthermore, these terms may depend not only on the power but also on other variables such as the energy or current delivered, consumed, or stored.

The variable to be used depends on the specific constrains for the application, for example, in some situations, the limiting condition might be the temperature of the power-carrying cables, in which case, $Vdc_{Link}$ would be a function of the power-carrying cable temperature rather than power.

It is also clear that equation (2) does not have to be a power clipping but it could be a limiting function for other variables. Furthermore, this limiting function does not necessarily have to follow a linear relationship with voltage. Instead if may include other linear or non-linear terms depending on the specific properties of each distributed resource. For example in a system combining solar with wind and/or Fuel Cells in a DC distribution system, it may be preferable that the operation of the fuel cell is maintained close to maximum power in order to maximize the efficiency and lifetime of the generator while the solar and wind can be ramped without penalty. In that case, the fuel cell power can be stepped down when the DC-link voltage reaches a high value while the solar and wind would be ramped when the voltage exceeds the nominal value. In general the DC-link voltage is variable according to a function preprogrammed in a controller as in (3), and the power, current, energy, or other adjusted variable from each component in the distribution system is decided based on the DC-link voltage using a pre established equation as in (4)

$$Vdc_{Link} = f(P,E,I) \quad (3)$$

$$P,E,I = f(Vdc_{Link}) \quad (4)$$

The limiting functions for the different generators and loads may be determined by cost, performance, or durability decisions and may differ from one generator to another in the same DC distribution system. Persons of ordinary skill in the art are readily able to generate functions to accommodate needs of this type and accordingly, further detail in this regard is neither required nor provided.

Example of a DC Micro-Grid with Variable DC-Link Voltage for Energy Management

Figure 3:
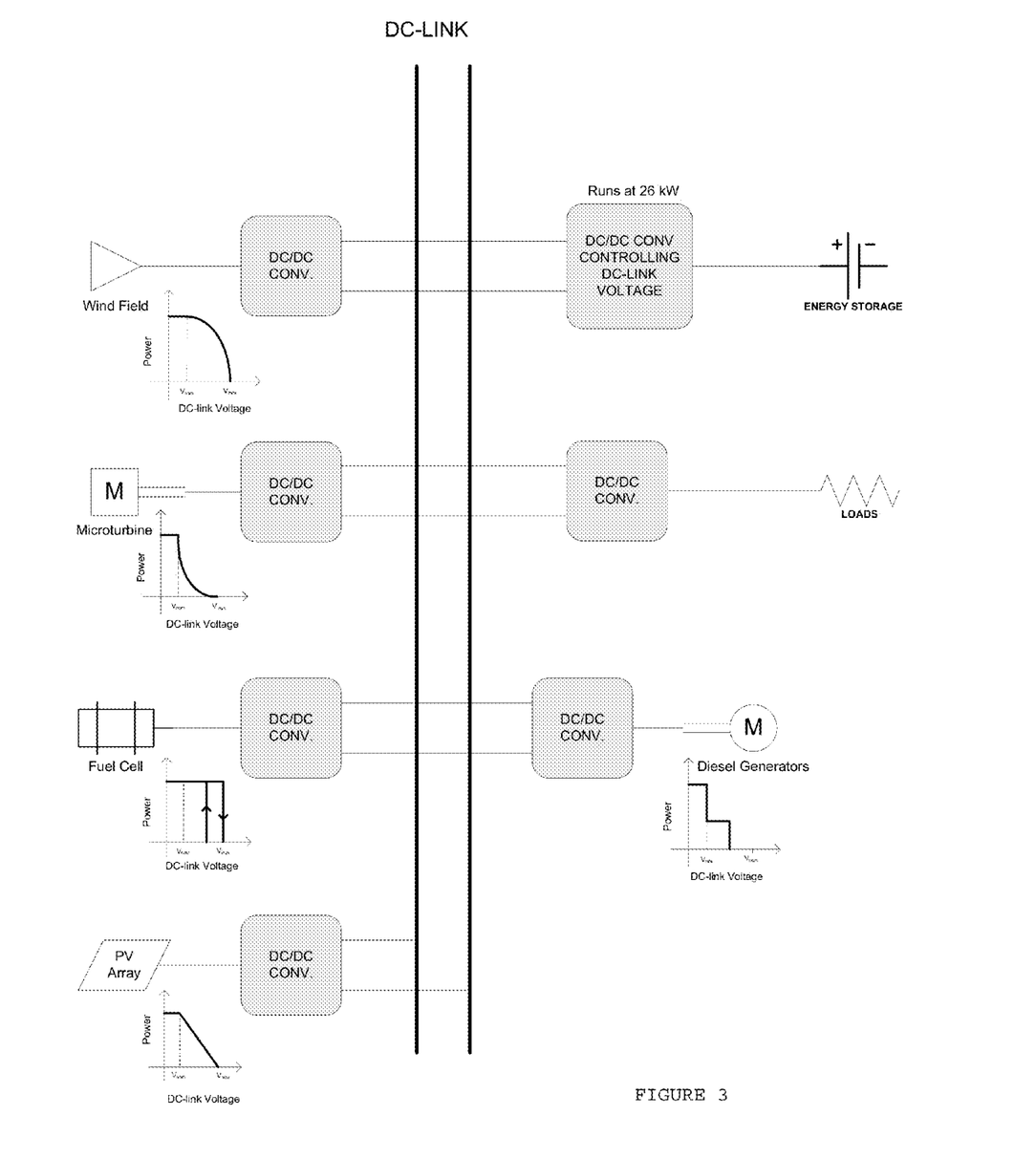
FIG. 3 is a schematic showing an example of a Micro-grid using an embodiment of the present invention.

An example of the general concept of the DC voltage droop and optimization of distributed sources and loads is shown in FIG. 3. Here a DC micro-grid with alternative and conventional power generators and loads in a common DC-link, operate in unison. An energy storage resource is used to instantaneously balance the generation with the load and maintaining the DC-link voltage at the desired level. A controller, that may or may not be part of the energy storage unit, is responsible for keeping the state of charge for the energy storage within limits. The energy storage controller could adjust the DC-link voltage to get more or less energy from the distributed resources and the distributed resources could have different power vs DC-link voltage (PvsV) functions depending on the cost and benefit of operating each of these distributed resources as is indicated in FIG. 3.

The PvsV equations can automatically change during the day or during different seasons during the year to minimize the operating cost of the micro-grid.

Although the example in FIG. 3 shows the loads as uncontrolled, some loads with lower criticality could also be programmed with PvsV equations or "shaved" based on the DC-link voltage so that they shut down partially or totally if there is low generation in the micro-grid and the energy storage is reaching low levels of charge. This will give full flexibility to controller to adjust the power production and power consumption within the micro-grid without the need for communication so that it can ensure the stability and continuous operation of the micro-grid. As in the case of the generators, the loads equation as function of the voltage could change depending on the time, season or other external characteristics.

Simulation of Variable Dc-Link for Power Clipping of Distributed Power Generators The use of the invention has been simulated in respect of a system having four independent generators feeding power to a common DC-link. Each generator is capable of providing 10 kW of power, for a total power of 40 kW. Because of power balancing or grid interconnection requirements, the power may have to be limited to values below the maximum 40 kW available and this limit value may change during the day or during different seasons. Thus, the need for power clipping.

Figure 4:
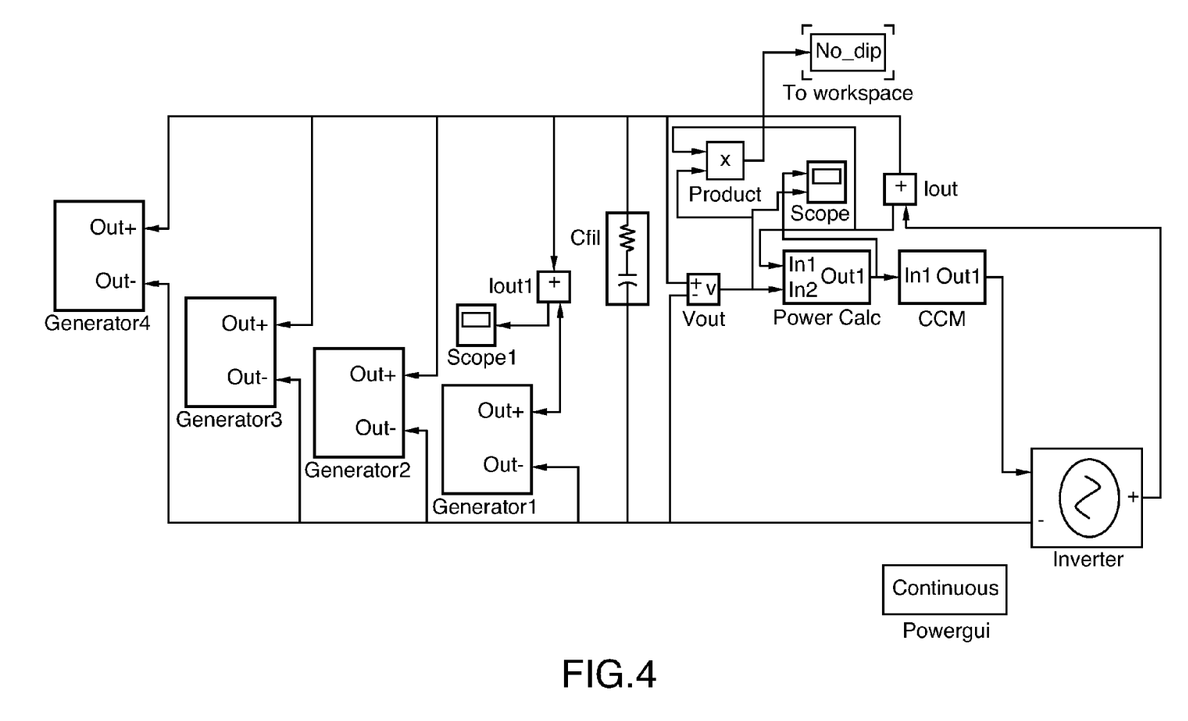
FIG. 4 is the top level module of a simulation constructed to test the invention.

The DC-link is controlled by a power converter that could be an inverter used to transfer power from the DC-link to a grid or to loads. This converter may also be a DC/DC converter interfacing with energy storage or other type of converter for different applications. The simulation was implemented in Simulink and the top level model is shown in FIG. 4.

For simplicity the inverter is herein represented as an ideal voltage source able to source or sink whatever current is required to maintain the DC-link voltage at the set-point level. The system includes a central control module (CCM), frequently located inside the inverter, which is responsible for processing the current and voltage measurements and for providing the DC-link reference voltage for the inverter. As indicated in the model, the only signal connected to each generator is the DC-link so there is no communication amongst generators or between generators and the inverter or CCM. The power calculation block is measuring the DC-link voltage, measuring the DC current into the inverter, calculating the actual power, and sending it to the CCM for the algorithm. The power calculation block can be integrated with the CCM and/or with the inverter. The rest of blocks in the model are only for simulation execution and verification.

Figure 5:
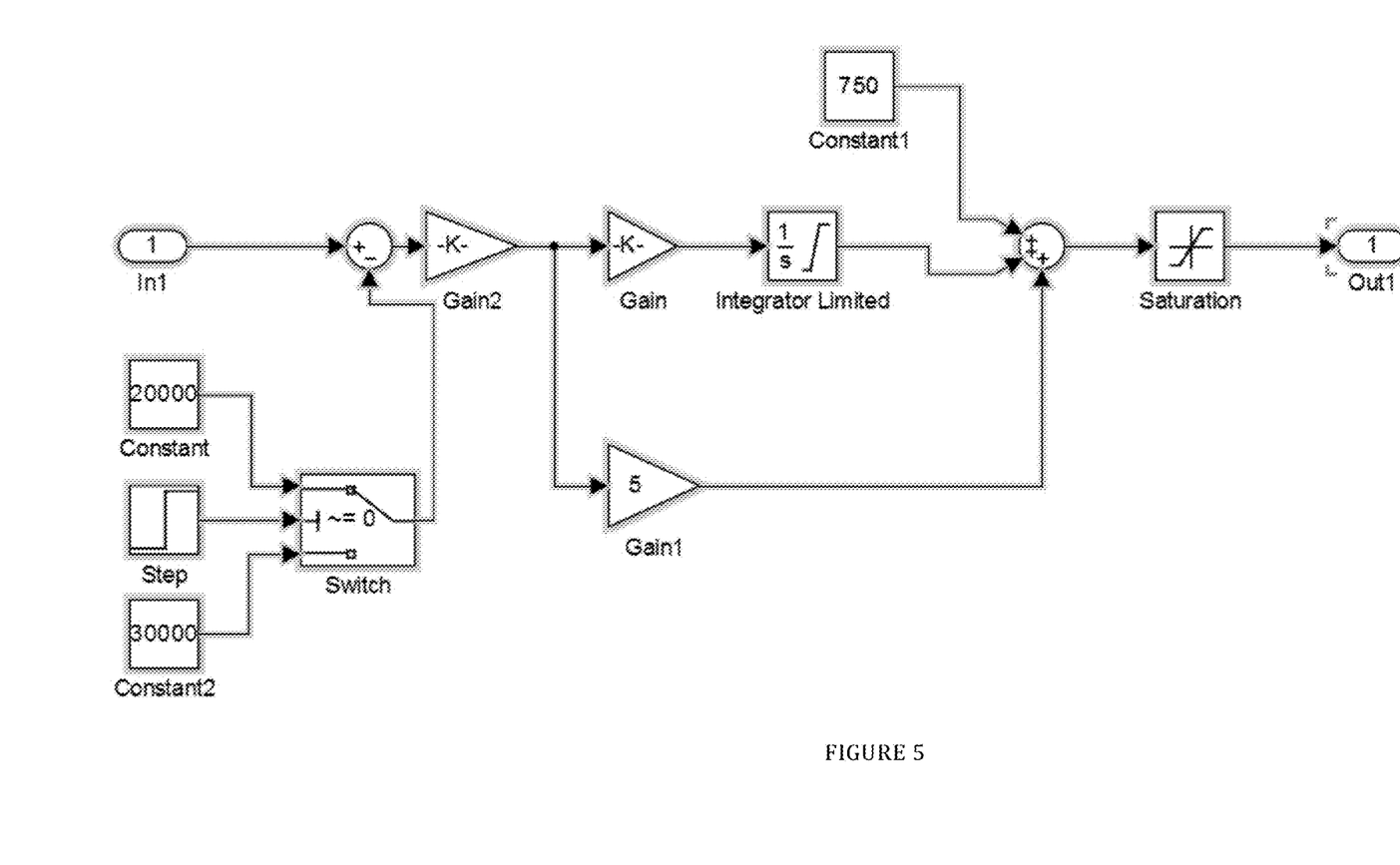
FIG. 5 is a diagrammatic representation of the central control module employed in the simulation of FIG. 4.

The manipulation of the DC link to achieve the power control (or clipping as in this example) is executed in the CCM. FIG. 5 shows the model for the CCM.

In this exemplary model, a PI controller used to keep the delivered power at the set point level, and the output of the controller is limited between 750 VDC and 800 VDC.

The circuit on the bottom left is used to change the power clipping value during the simulation, as explained later herein.

The generators use the DC-link voltage value to actively limit their power so that the complete system produces the maximum possible power without surpassing the limit in the CCM.

Figure 6:
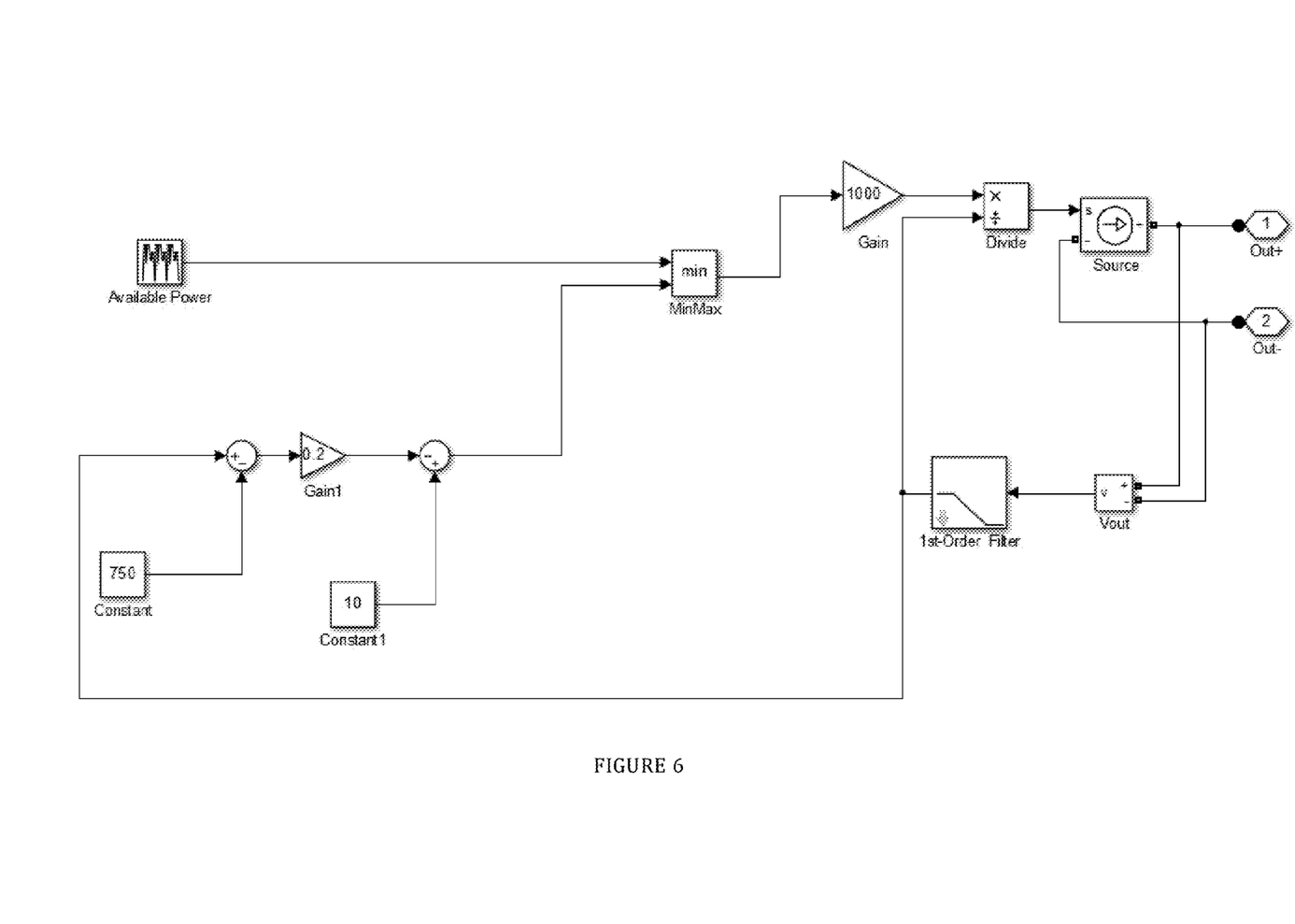
FIG. 6 is the diagrammatic representation of the generator module employed in the simulation of FIG. 4.

The model for the generator is shown in FIG. 6.

The generator has an available power input that is programmed to follow a specific pattern for each generator. It also has a section that calculates the maximum power that can be generated depending on the DC-link voltage. If the DC-link is at nominal value, the generator will produce all the power available. But if the DC-link voltage starts increasing, the power from the generator will be limited such that the total power from all the generators in the system is equal to the maximum allowed power from the CCM. The relationship between power limit and DC-link voltage for this example is linear and uses the same voltage range from the CCM (750 to 800 VDC). However, in general the response may be non-linear and the range may be different depending on the type of generator, the application, the accuracy and resolution of the measurements, etc. Finally the generated power is converted into a current source feeding power to the link for simplicity and to have a general representation of the generator. The only measurement in the generator required for the operation of the clipping is the DC-link voltage measurement.

Using the presented models, a simulation was performed to demonstrate the functionality of the concept. The sequence of events in the simulation is as follows:
- Initially there is a power limit of 30 kW for the system set at the inverter
- All four generators start with no power available
- The available power for each of the four generators ramps to 10 kW in one second
- The power available from each generator remains at 10 kW until t=2 sec
- The available power for each of the four generators is ramped down for 1 second to 5 kW
- At t=3 sec, two generators start ramping their available power up for 1 sec to 10 kW while the other two remain at 5 kW available power
- Two generators remain at 10 kW and the other two at 5 kW available power for one second
- At t=5 sec all the generators available power ramp for 1 sec to 6 kW
- All the generators remain at 6 kW available power until t=7 sec
- At t=6.5 sec the power limit for the system is changed to 20 kW. This may be required by the grid operator or the energy storage system.
- At t=7 sec the available power for all four generators ramps up for one sec to 8 kW
- The available power for all four generators remain at 8 kW until t=9 sec
- At t=9 sec, the available power for all the generators ramps down to 0 kW in one second reaching the same initial conditions for the simulation Three different simulations were performed, one without any power clipping, one wherein the clipping is pre-programmed on each generator, and one using the DC-link for active clipping.

Figure 7:
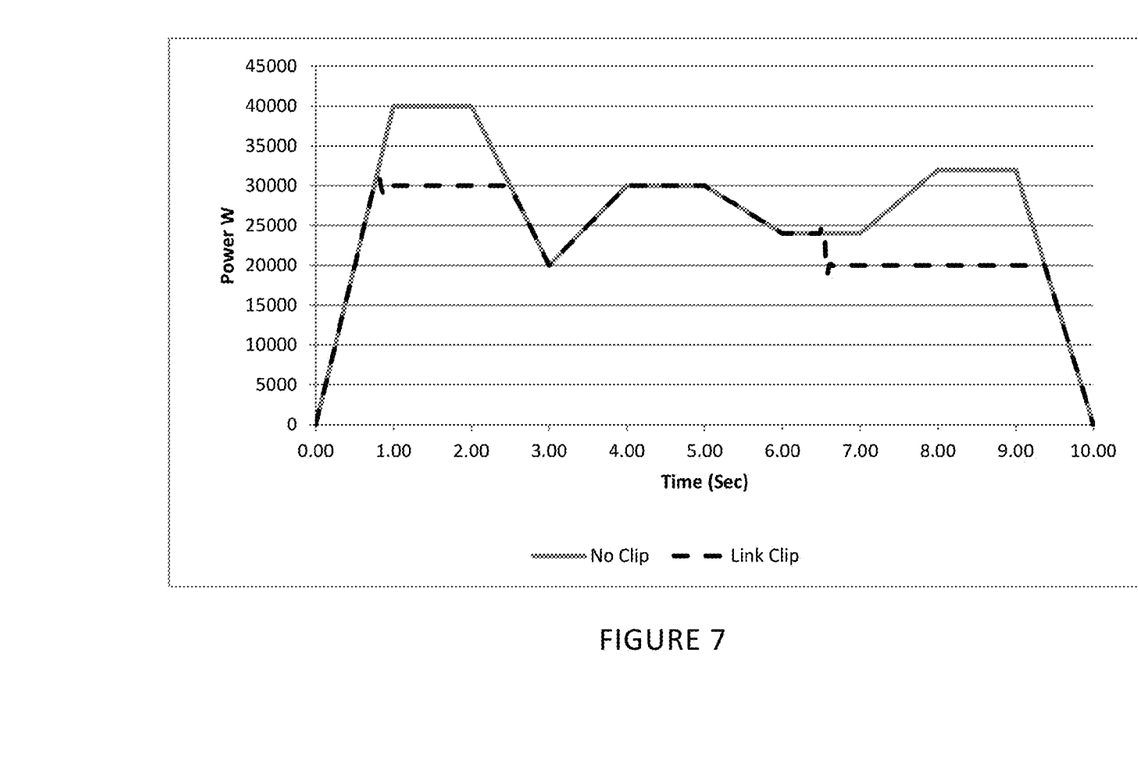
FIG. 7 shows modeling results evidencing the impact of the model in comparison to operation of a grid without power clipping.

FIG. 7 shows the generated power for the no clipping simulation and the active DC-link clipping.

The result indicates that without clipping the power is above the limit value in two different sections of the simulated pattern; one when there is high available power from all the generators and one when the power limit is reduced to 20 kW. In a real implementation, the inverter would be forced to shut down in these two areas resulting in loss of generated power. The use of the DC-link to limit the power ensures that the maximum power is maintained at the required level and that this level can be updated at the CCM but without any change in the operation or settings for the generators. As seen in the simulation, when clipping is started or the limit is modified, there is just a small disturbance in power as the controller regulates. This disturbance depends purely on the controller implementation and can be different from the present results.

Figure 8:
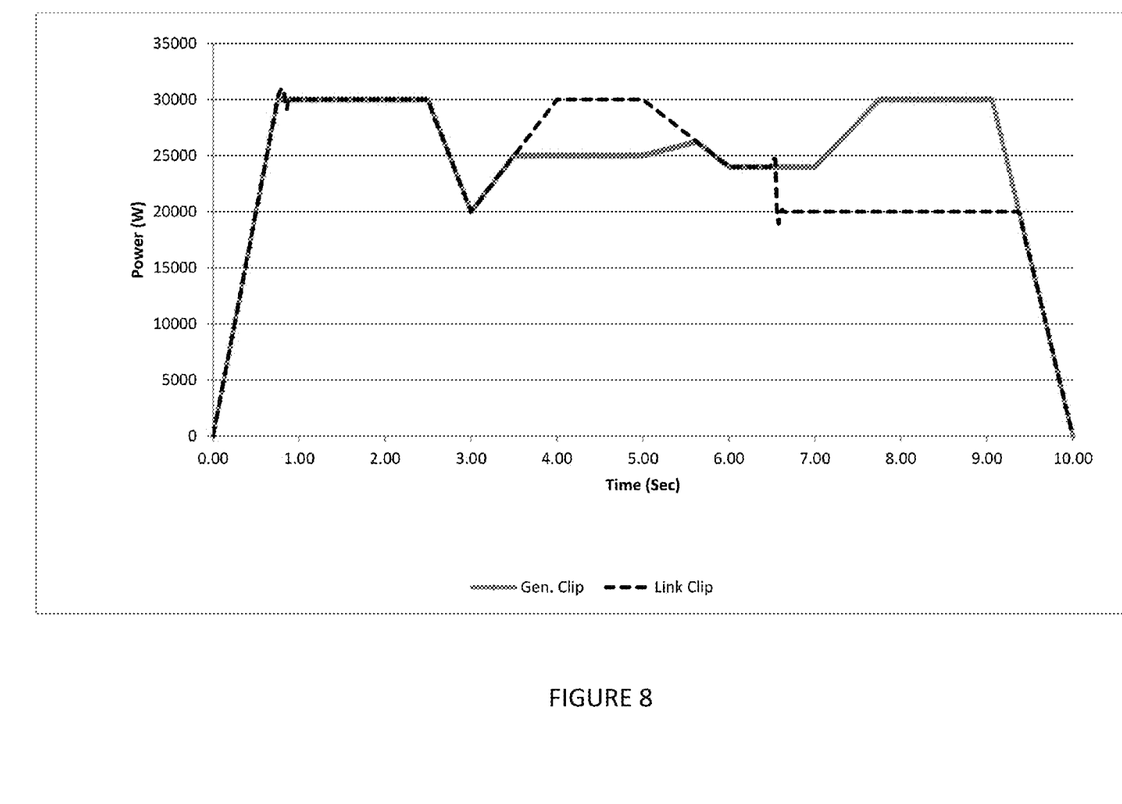
FIG. 8 shows modeling results evidencing the impact of the model in comparison to the operation of a grid with conventional power clipping.

FIG. 8 shows a comparison of the simulation for the system clipped at the generator and the system clipped using the DC-link. Clipping locally in each generator is commonly used in present distributed installations mainly in solar systems to ensure the interconnection limit is not surpassed. In this example since the four generators are 10 kW and the limit is 30 kW, each of the four generators is limited at 7.5 kW The simulation indicates that the clipping at each generator is successful limiting the power below a previously specified limit. However, note that around the 4 sec time the local clipping produced power which is below the limit of 30 kW while there is more power available. This is because some generators have high power available while others have low power available, but this information is not communicated amongst them. The DC-link based clipping produces exactly the limit value and is economically preferable. Also note that the generator clipping is not able to adjust the maximum value actively. Therefore, after 6.5 seconds, the inverter would be forced to shut down as in the case of the no clipping simulation. Although changes in clipping power can be pre-programmed daily or seasonally in each converter, they would not be able to be adjusted actively and dynamically.

In a solar plant, the changes in power available would be much slower that the ones used in this example. However, the fast transients used demonstrate that the method can quickly respond, and thus is useful for non-solar applications, such as might be required for energy storage or grid independent micro-grids are implemented.

What is claimed is:

1. A method for use with a plurality of elements, the elements including one or more sources and one or more loads, the method comprising the steps of:
   providing a regulated DC link adapted to carry power required by the one or more loads over a predetermined operating voltage range;
   coupling each of the one or more sources to the DC link using power conversion devices in a manner such that each of the one or more sources can operatively deliver the power to the DC link throughout the predetermined operating voltage range of the DC link;

coupling each of the one or more loads to the DC link either directly or through a power converter in a manner such that each of the one or more loads can operatively withdraw the power from the DC link throughout the predetermined operating voltage range of the DC link;

varying an amount of power exchanged between the DC link and one or one group of the elements to regulate a DC link voltage following a set point that is a function of the power exchanged and a constraint other than the power exchanged; and in respect of each of one or more of the elements other than the one or one group of elements, automatically varying the amount of power exchanged between the DC link and the each of the one or more of the elements other than the one or one group of elements in response to the a filtered value of a measured voltage of the DC link.

2. A method according to claim 1, wherein the one or one group of elements regulating the DC link voltage is an inverter, and the constraint other than the power exchanged effecting the DC link voltage set point includes an averaged power processed by the inverter over a period of time.

3. A method according to claim 2, wherein, in respect of the each of the one or more of the elements other than the one or one group of elements, the amount of power exchanged between the DC link and each element varies automatically in response to the filtered value of the measured voltage of the DC link to provide for load clipping of the power produced by the one or more of the elements other than the one or one group of elements so that the inverter average power constraint is not exceeded.

4. A method according to claim 1, wherein the one or one group of elements controlling the DC link voltage is one or a group of energy storage elements interconnected to the DC link through a DC/DC converter, and the constraint other than the power exchanged effecting the DC link voltage set point includes a state of charge for the energy storage elements.

5. A method according to claim 4, wherein, in respect of the each of the one or more of the elements other than the one or one group of elements, the amount of power exchanged between the DC link and said each of one or more of the elements other than the one or one group of elements varies automatically in response to the filtered value of the measured voltage of the DC link to provide for energy management.

6. A method according to claim 1, wherein the each of the one or more of the elements other than the one or one group of elements has fixed logic associated providing for such automatic variance of the power exchanged between the DC link and the each of the one or more of the elements other than the one or one group of elements.

7. A method according to claim 6, wherein the fixed logic automatically varies the power exchanged between the DC link and the each of the one or more of the elements other than the one or one group of elements as a function of the filtered value of the measured voltage of the DC link and one or more of time of day and season.

8. A method according to claim 6, wherein the each of the one or more of the elements other than the one or one group of elements has dynamic logic associated therewith, the logic providing for such automatic variance of the power exchanged between the DC link and the each of the one or more of the elements other than the one or one group of elements according to a function defined from time to time.

* * * * *